United States Patent
Brady et al.

(10) Patent No.: US 10,396,997 B2
(45) Date of Patent: Aug. 27, 2019

(54) CONTAINER-BASED OPERATING SYSTEM AND METHOD

(71) Applicant: International Business Machines Corporation, Armonk, NY (US)

(72) Inventors: Simon J. Brady, Dublin (IE); Jonas E. Bryllert, Dublin (IE); John V. Delaney, Meath (IE); Barry Hollywood, Meath (IE); Clea A. Zolotow, Key West, FL (US)

(73) Assignee: International Business Machines Corporation, Armonk, NY (US)

( * ) Notice: Subject to any disclaimer, the term of this patent is extended or adjusted under 35 U.S.C. 154(b) by 370 days.

(21) Appl. No.: 15/379,196

(22) Filed: Dec. 14, 2016

(65) Prior Publication Data

US 2018/0167217 A1    Jun. 14, 2018

(51) Int. Cl.
| | |
|---|---|
| *H04L 9/32* | (2006.01) |
| *H04L 29/08* | (2006.01) |
| *G06F 8/65* | (2018.01) |
| *G06Q 50/18* | (2012.01) |
| *G06F 21/12* | (2013.01) |

(52) U.S. Cl.
CPC .............. *H04L 9/3247* (2013.01); *G06F 8/65* (2013.01); *G06F 21/12* (2013.01); *G06Q 50/18* (2013.01); *H04L 67/10* (2013.01); *H04L 67/34* (2013.01); *H04L 2209/38* (2013.01)

(58) Field of Classification Search
CPC .................................................... H04L 9/3247
USPC ........................................................ 713/168
See application file for complete search history.

(56) References Cited

U.S. PATENT DOCUMENTS

| | | | | |
|---|---|---|---|---|
| 9,378,387 | B2* | 6/2016 | Roush | G06F 21/53 |
| 9,397,985 | B1* | 7/2016 | Seger, II | H04L 63/0442 |
| 10,115,068 | B2* | 10/2018 | Vivier | G06Q 10/0832 |
| 10,135,835 | B1* | 11/2018 | Kandel | G06F 21/40 |
| 10,146,792 | B1* | 12/2018 | Dobrek | G06Q 20/3829 |
| 10,192,198 | B2* | 1/2019 | Nazzari | G06Q 10/087 |
| 10,262,140 | B2* | 4/2019 | Smith | H04L 9/3236 |
| 2002/0147611 | A1* | 10/2002 | Greene | G06Q 10/063112 |
| | | | | 705/1.1 |

(Continued)

OTHER PUBLICATIONS

Jose G. Faisca ; Universidade Lusofona, Copelabs—Ecati, Lisboa, Portugal ; Jose Q. Rogado, Personal Cloud Interoperability, 2016 IEEE 17th International Symposium on a World of Wireless, Mobile and Multimedia Networks (WoWMoM) Jun. 21-24, 2016, Abstract.

*Primary Examiner* — Dant B Shaifer Harriman

(57) ABSTRACT

In a distributed network hosting a shared pool of configurable computing resources there is provided one or more system instances of a blockchain. Each system instance comprises a virtual machine and a set of containers. The containers are members of the blockchain in that the blockchain's public ledger records encrypted copies of at least selected directories of each container. Each container that is in the set can thus verify whether any other container also belongs to the same set with reference to the public ledger, since the transactions recorded on the public ledger are encrypted copies of the set's containers. The use of a blockchain thus allows a system boundary to be defined around a set of containers by the initial specification of the blockchain. The system boundary can be defined to ensure that the set of containers comply with legal requirements, such as a geographic restriction.

20 Claims, 13 Drawing Sheets

(56) References Cited

U.S. PATENT DOCUMENTS

| | | | |
|---|---|---|---|
| 2013/0046884 A1* | 2/2013 | Frost | G06Q 10/087 |
| | | | 709/224 |
| 2013/0263139 A1 | 10/2013 | Schejter et al. | |
| 2015/0113290 A1 | 4/2015 | Auradkar et al. | |
| 2017/0046806 A1* | 2/2017 | Haldenby | G06Q 20/0655 |
| 2017/0111175 A1* | 4/2017 | Oberhauser | H04L 9/3247 |
| 2018/0137306 A1* | 5/2018 | Brady | H04L 9/0643 |
| 2018/0157825 A1* | 6/2018 | Eksten | G06F 21/64 |
| 2018/0196836 A1* | 7/2018 | Sundaram | G06F 12/08 |
| 2018/0219686 A1* | 8/2018 | Cronie | G06Q 20/065 |
| 2018/0232526 A1* | 8/2018 | Reid | H04L 9/3239 |
| 2019/0020665 A1* | 1/2019 | Surcouf | H04L 67/10 |
| 2019/0102409 A1* | 4/2019 | Shi | G06F 16/2379 |

* cited by examiner

CONTAINER-BASED OPERATING SYSTEM AND METHOD

FIELD OF THE DISCLOSURE

The present disclosure relates to a container-based operating system and method for a distributed network hosting a shared pool of configurable computing resources.

BACKGROUND

Cloud computing-related definitions and standards have been developed by the US National Institute of Standards and Technology (NIST). The present document is to be interpreted with reference thereto, specifically to "The NIST Definition of Cloud Computing" (September 2011) by Peter Mell and Timothy Grance, NIST Special Publication 800-145.

The NIST definition of cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

Cloud storage in its current form is dominated by service providers which constitute a third party that is trusted by customers to host their data securely. In other words, the trusted central authority model is being used, as in traditional Internet banking, or by government agencies providing central databases for vehicle registrations, real property ownership and so forth.

FIG. 1 is a schematic drawing of a standard cloud storage architecture. Two example users 14 are shown with respective computer devices 25 having files 16 which they wish to store to the cloud, i.e. on a virtualized server 12 owned by a cloud provider. The cloud provider supplies an application 18 for the users 14 via which the users 14 may upload (i.e. store) and download (i.e. access) their files 16 to the virtualized server 12. In turn, the virtualized server 12 uses at least three physical servers 20, on which to store the data of each client file to ensure at least a minimum of redundancy. There is no standard way of carrying out end-to-end encryption within this architecture, so it is vulnerable to security threats. In its basic form, client data being transferred between user computers 25, the application 18, and the cloud provider's servers 12, 20 is not encrypted, so attacks of the transmission lines (snooping), the user computers 25, the application 18 and the servers 12, 20 are all possible.

To get away from this traditional architecture and provide a more secure environment, it has been instant to use blockchain technology which is based on a peer-to-peer network structure.

FIG. 2 shows an example peer-to-peer network 55 as would be part of a cloud computing environment. The network includes network nodes 10, each of which is one or more physical or virtual hardware network entities with which users may interact. The network nodes 10 are connected by communication lines 15. The network entities may be for example, mainframes 61; servers of different types 62, 63, 64; mass storage devices 65 or may be more consumer-oriented devices, such as personal computers, tablets, smart phones, or devices associated with the internet of things (IoT), such as white goods (refrigerators, freezers, washing machines), IP cameras, printers, factory equipment or television recorders.

Blockchain technology does not use the trusted central authority model, but rather provides a distributed database of records comprising a publicly accessible ledger of all transactions or events that have taken place between participating parties, i.e. the members of the blockchain who are at respective nodes of a peer-to-peer network as illustrated in FIG. 4. Each member has a public key, which serves as that member's address, and a private key, which the member uses to digitally sign transactions. A transaction is effected by one member digitally signing the transaction with his private key and sending it to another member using that member's public key as the address. The recipient member then uses the public key of the sending member to verify the digital signature on the transaction. The transaction is placed in a block which is broadcast to every node on the blockchain network and through a process of puzzle solving called 'mining' performed by other members the transaction, and any other transactions in the same block, are verified as being valid. The block is then permitted to be added to the chain, thereby becoming part of the public transaction ledger. The blocks of a blockchain are the elements of an ever-extensible sequence of linked events stored on the ledger. What links one block to the previous block in the chain is a hash of the previous block. The hash may be considered as being a token which is proof of the work that the mining member has performed in solving the puzzle and determining the transaction hash by brute force. Each block contains a timestamp and a number of transactions. Each block, once embedded in the chain, becomes effectively impossible to edit, whether intentionally or by hacking, with the security against editing increasing rapidly as a block moves further away from being the end block.

Blockchain technology is described in the article "Bitchain Technology Beyond Bitcoin" by Michael Crosby et al, Oct. 16, 2015 (http://scet.berkeley.edu/wp-content/uploads/BlockchainPaper.pdf), the entire contents of which are incorporated herein by reference.

FIG. 3 is a schematic drawing of a fragment of a blockchain 57 as described above. Three adjacent blocks 2, labeled N, N+1 and N+2 in the middle of the blockchain 57 are illustrated, with Block N being the oldest block of the three and Block N+2 the youngest. Block N includes a ledger portion 4 with a timestamp which records consecutive blockchain transactions TxS 'c' to T. Block N+1 records the next group of transactions 'g' to 'm' and Block N+2 the transactions after that, 'n' to 'w'. The obliquely oriented arrows labeled HASH are what connects the adjacent blocks, i.e. a subsequent block, e.g. Block N+2, stores the hash to the previous block N+1.

Trust is automated by the public nature of the ledger and by the security measures built into such systems to ensure the blocks of the blockchain cannot be changed. The need for a single trusted authority to mediate between non-trusting transacting parties is done away with.

FIG. 4 is a schematic drawing of a blockchain cloud storage system as offered by Storj. The Storj system uses MetaDisk. In the Storj architecture, a peer-to-peer network 55 of the kind shown in FIG. 2 includes a blockchain 57 and associated public ledger 26. Two example members 14 of the blockchain have associated computer devices 25 which each are part of a node of the network 55. If one member 14 wishes to store a data file 16 to the blockchain cloud storage network, that member subdivides the file into manageable portions, referred to as shards, and encrypts them using his private key 22 before they are distributed out for storage in the network among fellow members of the same blockchain. A blockchain member providing space to the cloud store is called a farmer. Blockchain members can be cloud storage users and/or farmers. MetaDisk is an intermediary which receives and routes customer data to storage locations in the network and can apply a suitable data redundancy rule, such as 3-locations.

FIG. 5 is a schematic drawing showing the sharding process used by the Storj system. As mentioned above, a shard as an encrypted portion of a file that is to be stored. The shards are kept to a fixed size so that the shard size contains no information that may be of assistance to a hacker, with unused space being padded out. Taking the example of a data file 16 with a size of 70 MB, this is split into multiple smaller files 30 of fixed size, illustrated as 32 MB, which are the proto-shards. Each smaller file 30 is encrypted using the members private key 22 and then sent with its hash to the blockchain network 55, 57 for storage.

The Storj system is described in the article: "Storj A Peer-to-Peer Cloud Storage Network" by Shawn Wilkinson et al, Dec. 15, 2014 v1.01 (https://storj.io/storj.pdf), the entire contents of which are incorporated herein by reference.

The files which have been referred to above may be container files, referred to as containers in the following. As more and more systems are moved onto cloud based infrastructure, the data and services that run on containers have increasingly become important. Software containers or containers are virtual machines instances which are isolated from each other and run concurrently on a hardware node as an intermediate layer between the hardware and the operating system. The software, firmware or hardware that creates and runs such a virtual machine instance is referred to as a hypervisor or virtual machine monitor (VMM). In this document, we mainly use the term hypervisor.

This approach is referred to as container-based virtualization, server virtualization or operating system virtualization. Each container represents a virtual environment which has a defined set of hardware resources which are unrelated to the actual available hardware and serve as a basis for configuring the operating system. An example of a container is a docker container. Docker containers run on Linux® applications and wrap up a self-contained piece of software that includes everything needed to run, such as an operating system, system tools, system libraries, so that it will always run in the same way. Linux is a registered trademark of Linus Torvalds in the United States, other countries, or both.

It is well known that there is an inherent tension between the cloud and legal compliance with national data protection laws. The distributed nature of cloud storage or cloud-based applications has as its essence flexible distribution of data over a network without geographical limitation. On the other hand, national laws on data protection are by definition territorially defined. In Europe, the "Article 29 Working Party" was tasked specifically with looking at how cloud storage could fit within the EU Data Protection Directive (95/46/EC) and the EU e-privacy Directive (2002/58/EC) and issued its opinion in 2012. In Germany, there are also strong criminal sanctions against failure to safeguard personal data (Section 203 of the German Criminal Code StGB) which need to be taken account of. Legal compliance and legal risk management by cloud providers and cloud users, such as businesses and government agencies, may entail ensuring that specific data and services that run on cloud-based infrastructures are located in a specific country or region, and/or that only certain parties have access to specific data and services.

Take the example of a business which has embraced container-based systems for part of its IT infrastructure and uses not just one, but multiple cloud service providers. Such a business will have containers or other file types spread across multiple cloud providers, each container being distributed over multiple servers. It can be appreciated that managing legal data protection issues can become very complex very quickly.

FIG. 6 shows an example system in which three groups of containers are associated with respective cloud storage providers. Suppose a single business owns these container groups and needs them to operate within a system boundary 28, such as a geographical boundary. Three groups of containers 40_1, 40_2 and 40_3 are stored respectively with three different cloud storage providers that have respective virtual servers 12_1, 12_2 and 12_3, each storing their customer data in some complex fashion over multiple physical servers (not illustrated). How can the owner of the containers exercise control over how and where the cloud storage providers store the data that makes up these containers?

BRIEF SUMMARY OF THE DISCLOSURE

The present disclosure provides a blockchain implementation of cloud-based services that is designed to deal with legal compliance issues, such as geographic restrictions and rights management.

According to an aspect of the disclosure, there is provided a distributed network hosting a shared pool of configurable computing resources suitable for hosting one or more system instances of a blockchain having a public ledger that records transactions in the blockchain, the distributed network comprising at least one such system instance, wherein each system instance comprises a virtual machine and a set of containers, wherein the containers are operable to run on the virtual machine and each comprise a blockchain subsystem operable to run the blockchain on the container, wherein the blockchain is defined such that the containers of the set are the members of the blockchain in that the public ledger records encrypted copies of at least selected parts of each container of the set, so that each container of the set can with reference to the public ledger determine whether another container in the distributed network also belongs to the set, thereby creating a system boundary for the set of containers which acts as a barrier to prevent undesired interaction with other containers that are not in the set.

The instant blockchain system can provide the flexibility to create new containers within the blockchain. Namely, in certain embodiments, one container is designated in each system instance to have the role of system instance controller. The system instance controller has the sole right to create new containers for the set, the system instance controller being operable to create such new containers. The new container creation is thus handled as a blockchain transaction. The role of system instance controller is preferably rotated over time among different ones of the containers. A further area where flexibility can be provided is to handle software updates on the containers. Namely, in certain embodiments, whenever a container receives a software update, an encrypted copy of the updated container is recorded on the public ledger. A software update is thus handled as a blockchain transaction. In this way, the public ledger keeps copies of the most recent version of each container, as well as copies of all previous versions, thereby providing a fully auditable history.

In use, the system boundary is policed as follows. When a container of the set has a need to interact with another container, e.g. code being run on the container includes a function call to another container, the container checks whether the other container is part of the same set before executing the function call. The container of the set initiates communication with the other container to obtain identification information. It then checks whether or not the other container is in the set by searching the public ledger for a transaction containing the encrypted copy of the other container. If no such transaction is found the container knows that the other container is not in the set, so knows not to interact with the other container, e.g. does not execute the function call. If the container of the set determines the other container is not in the set, it may also record the fact on the public ledger, so all other containers in the set know they should firewall the other container from that record, rather than through repeating the process of searching the whole public ledger for a copy of the other container.

The instant system allows any number of system instances to co-exist on the distributed network as well as other containers that do not belong to any of the system instances and are not part of a blockchain. It will be understood that in the instant system a container belonging to one system instance is precluded from belonging to another system instance.

The system boundary can be defined so as to impose a geographical restriction, so that there are physically limits on where the containers may reside among the shared pool of configurable computing resources that form the distributed network. For example, all containers may be confined to a particular jurisdiction or group of jurisdictions, such as the European Union, Germany, the State of Delaware, the United States, the British Virgin Islands or wherever. The system boundary may also be defined with some other restriction, such as type of user.

According to another aspect of the disclosure, there is provided a software container operable to run on a virtual machine, the container comprising: a memory resource; a processing resource; a blockchain subsystem operable to run a blockchain on the container using the processing resource, wherein the blockchain has a public ledger; and a copy of the public ledger stored in the memory resource, wherein the blockchain is defined such that the public ledger records encrypted copies of at least selected parts of the said container and each of at least one other container, these containers collectively constituting a set of containers who are members of the blockchain. The container may have the exclusive right to create new containers for the blockchain.

According to a further aspect of the disclosure, there is provided a computer program product storing a software container described herein.

According to another aspect of the disclosure, there is provided a method of creating a new container that is performed in a distributed network hosting a shared pool of configurable computing resources in which there exists a system instance of a blockchain, the members of the blockchain being containers and the blockchain having a public ledger that records transactions in the blockchain, wherein the blockchain is defined such that the public ledger records encrypted copies of at least selected parts of each container of the set, the method comprising one or more of:

designating one of the containers to have the role of system instance controller, wherein the system instance controller has the sole right to create new containers for the set;

creating the new container by the system instance controller;

encrypting a copy of at least selected parts of the new container such that the new container creation is handled as a blockchain transaction; and recording the encrypted copy on the public ledger.

According to yet a further aspect of the disclosure, there is provided a method of performing a software update on a container that resides in a distributed network hosting a shared pool of configurable computing resources in which there exists a system instance of a blockchain, the members of the blockchain being containers including the container on which the software update is to be performed, the blockchain having a public ledger that records transactions in the blockchain, the method comprising one or more of:

executing the software update on the container;

encrypting a copy of at least selected parts of the updated container such that the software update is handled as a blockchain transaction; and recording the encrypted copy on the public ledger.

According to yet another aspect of the disclosure, there is provided a method for a first container to check if a second container belongs to the same set of containers that is performed in a distributed network hosting a shared pool of configurable computing resources in which there exists a system instance of a blockchain, the members of the blockchain being the containers of said set, which include at least the first container, and the blockchain having a public ledger that records transactions in the blockchain, wherein the blockchain is defined such that the public ledger records encrypted copies of at least selected parts of each container of the set, the method comprising one or more of:

the first container in the course of executing a sequence of software commands arriving at a command to access a second container;

the first container establishing a network connection to the second container and obtaining information regarding the identity of the second container;

the first container referring to the public ledger to determine whether the second container is recorded in a transaction on the blockchain;

absent such a transaction record inferring the second container is not a member of the blockchain and refraining from executing the command to access the second container, whereas present such a transaction record inferring the second container is a member of the blockchain and executing the command to access the second container.

In some embodiments, if the second container is not a member of the blockchain, the method also records this fact on the public ledger such that the determination that the second container is not a member of the blockchain is handled as a blockchain transaction.

The instant system thereby allows the definition of a collection of container-based systems across multiple hosting providers as one system instance, with the containers being secure and auditable by using a blockchain to tie all containers of the same system instance together, thereby defining a system boundary which is completely controllable and verifiable.

BRIEF DESCRIPTION OF THE DRAWINGS

In the following, the present disclosure will further be described by way of example only with reference to exemplary embodiments illustrated in the figures.

DETAILED DESCRIPTION OF THE PREFERRED EMBODIMENTS

In the following detailed description, for purposes of explanation and not limitation, specific details are set forth in order to provide a better understanding of the present disclosure. It will be apparent to one skilled in the art that the present disclosure may be practiced in other embodiments that depart from these specific details.

Figure 1:
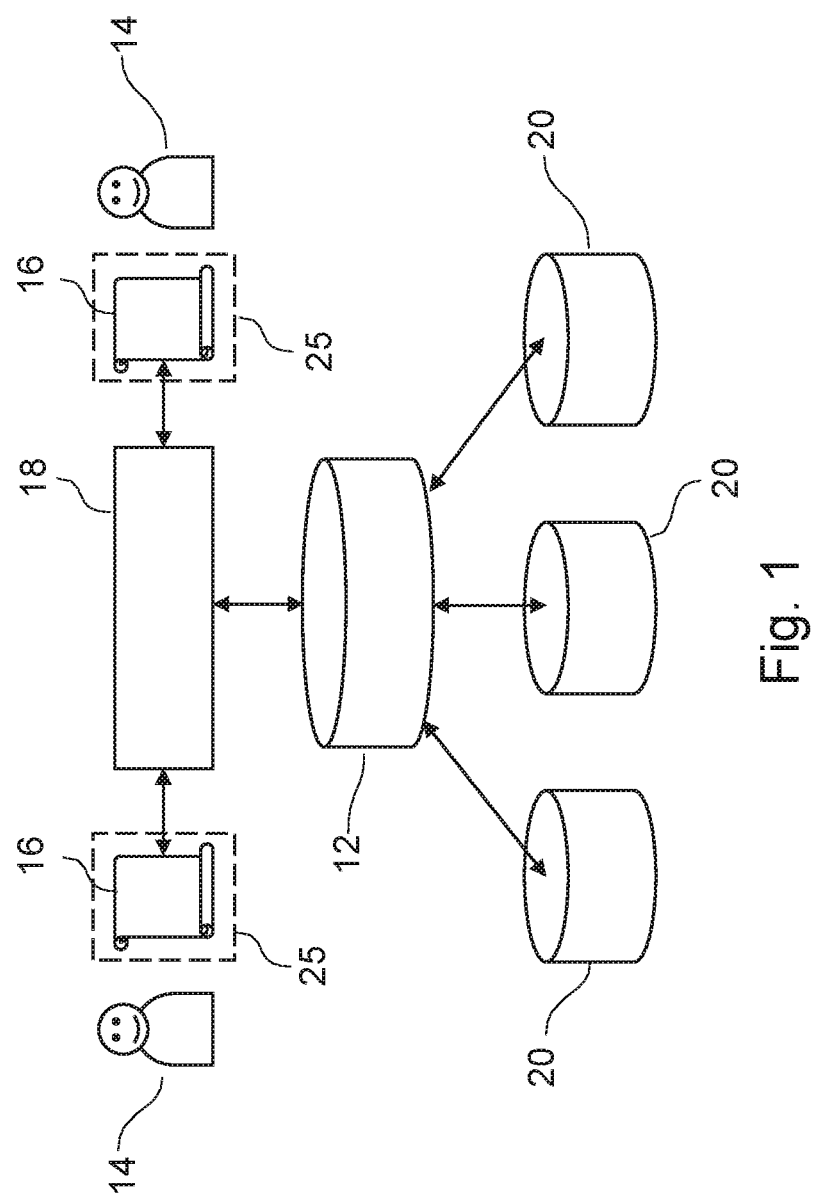
FIG. 1 is a schematic drawing of a standard cloud storage architecture.
Figure 2:
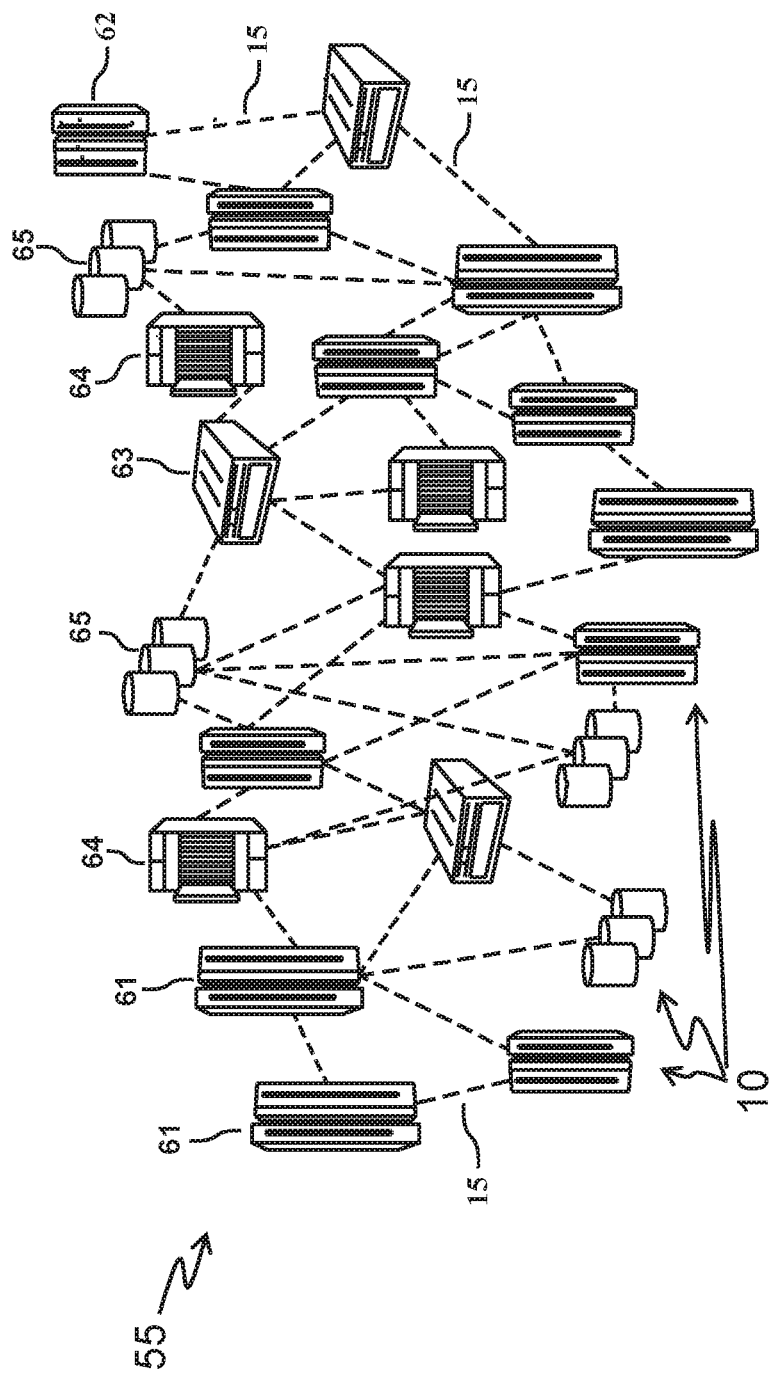
FIG. 2 shows an example peer-to-peer network as would be part of a cloud computing environment.
Figure 3:
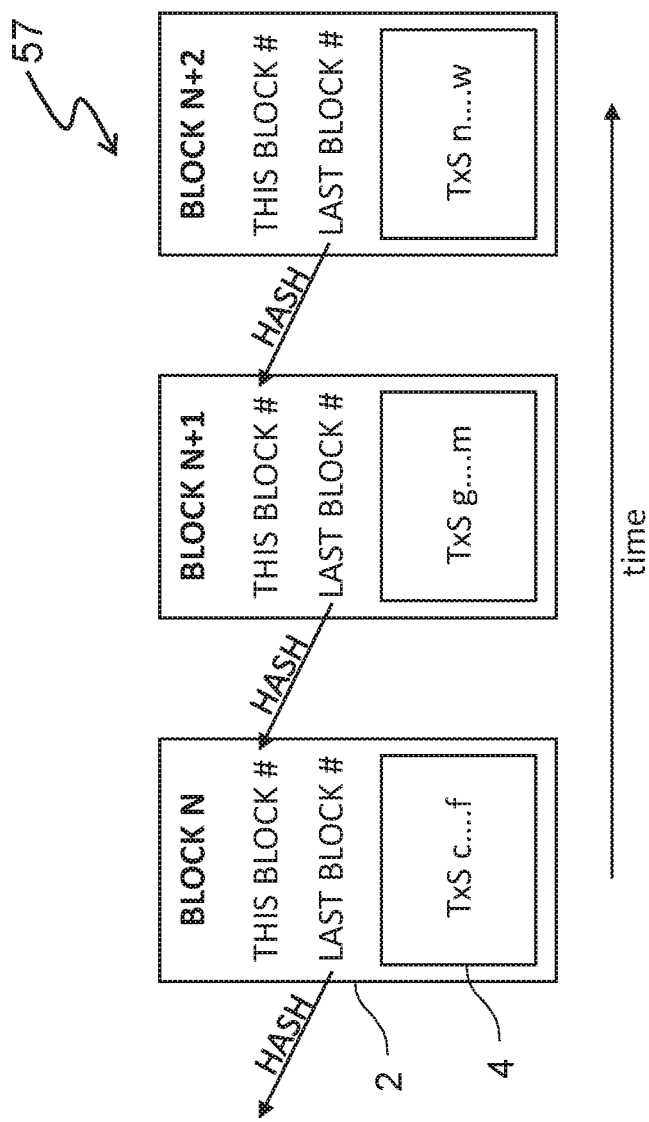
FIG. 3 is a schematic drawing of a fragment of a blockchain.
Figure 4:
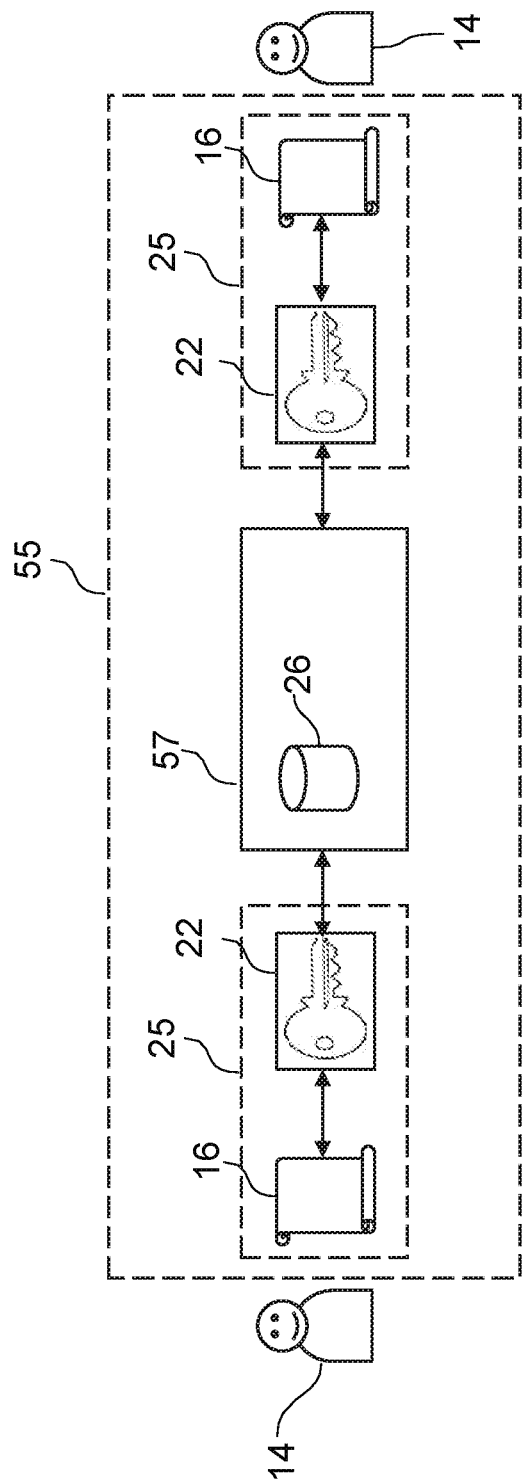
FIG. 4 is a schematic drawing of a known blockchain cloud storage system.
Figure 5:
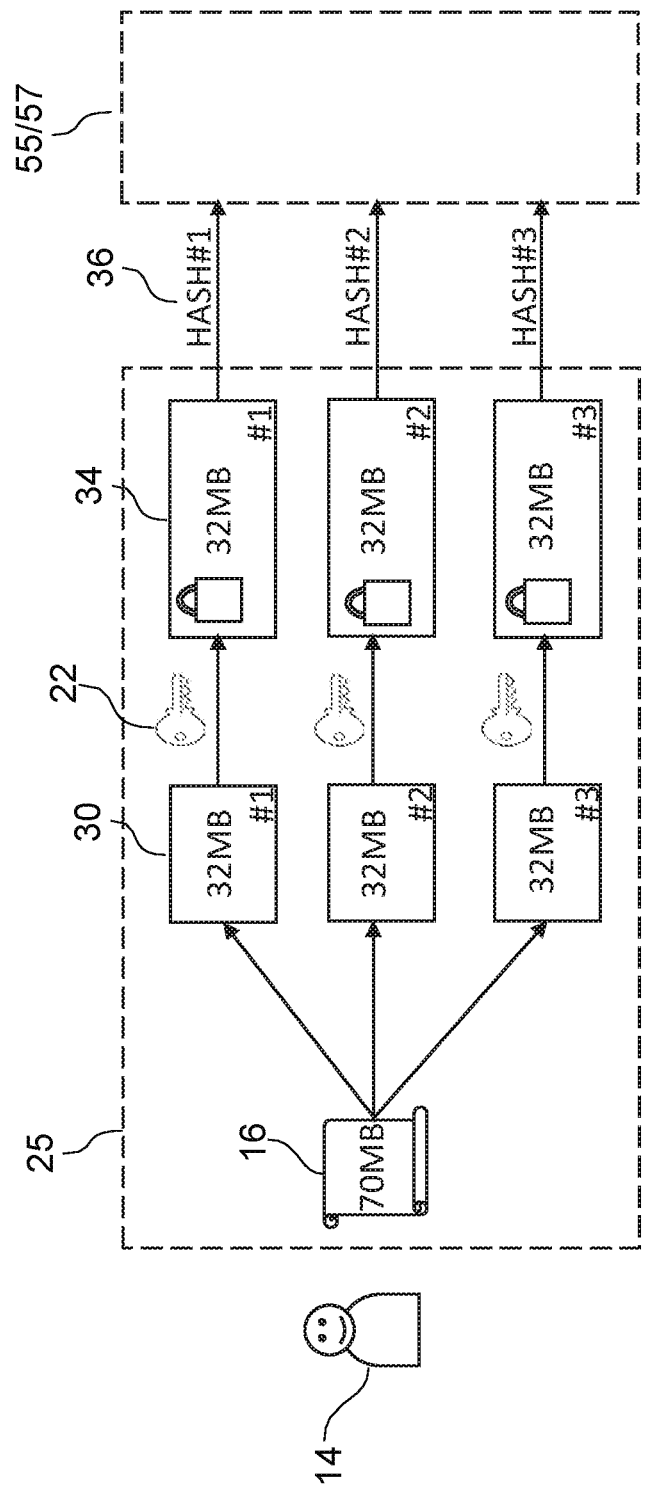
FIG. 5 is a schematic drawing showing the sharding process used by the blockchain cloud storage system of FIG. 4.
Figure 6:
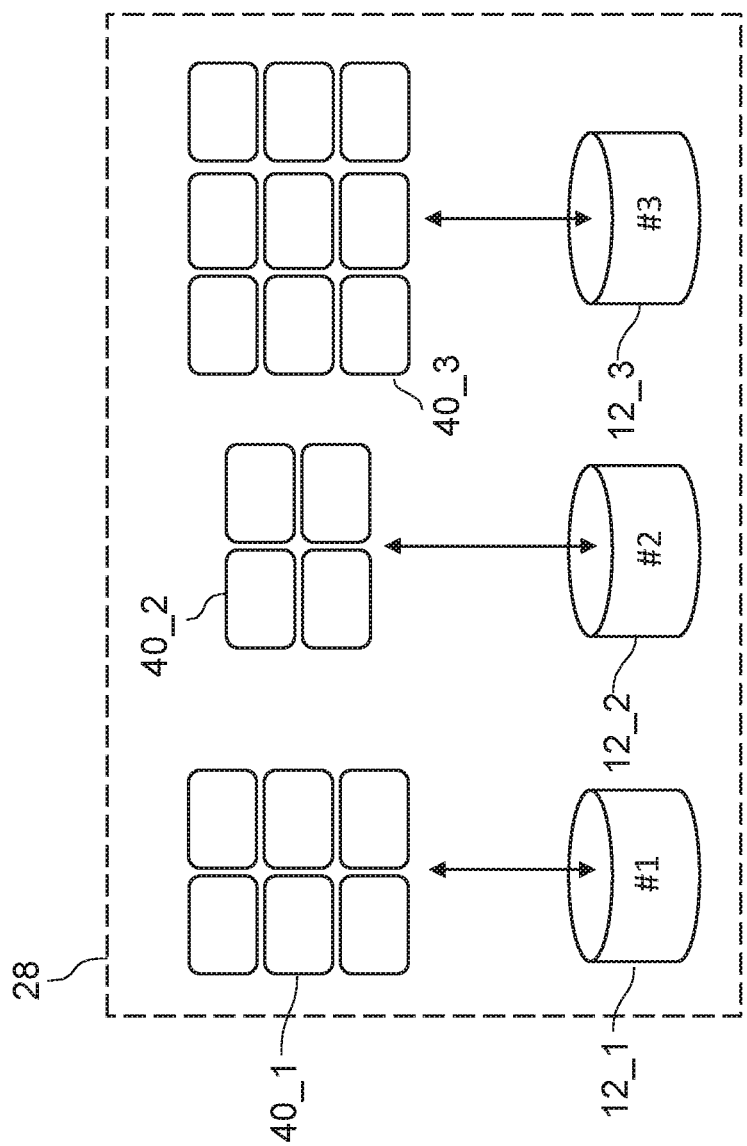
FIG. 6 shows an example system in which three groups of containers are associated with respective cloud storage providers and need to be confined within a system boundary.
Figure 7:
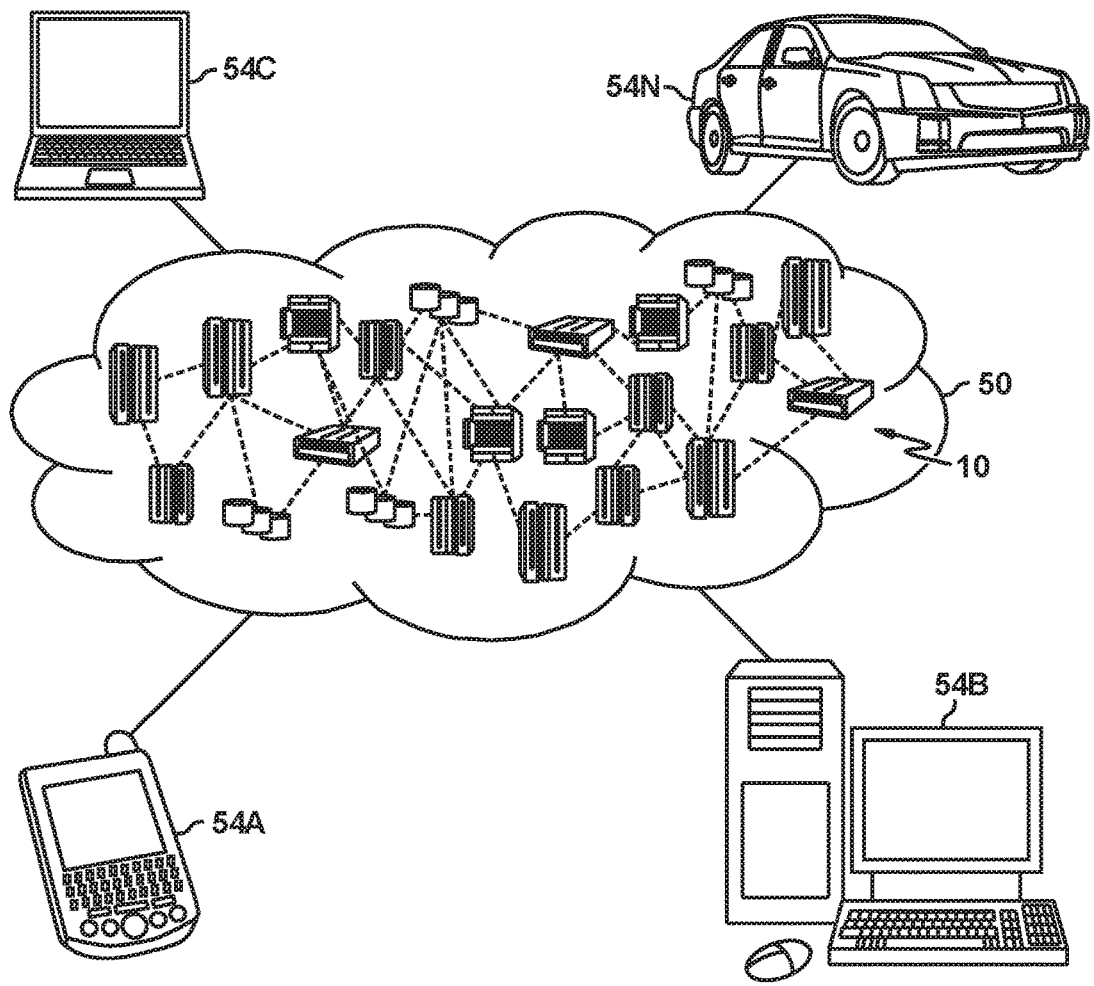
FIG. 7 shows an example cloud computing environment suitable for hosting embodiments of the disclosure.

FIG. 7 shows an example cloud computing environment 50. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 8:
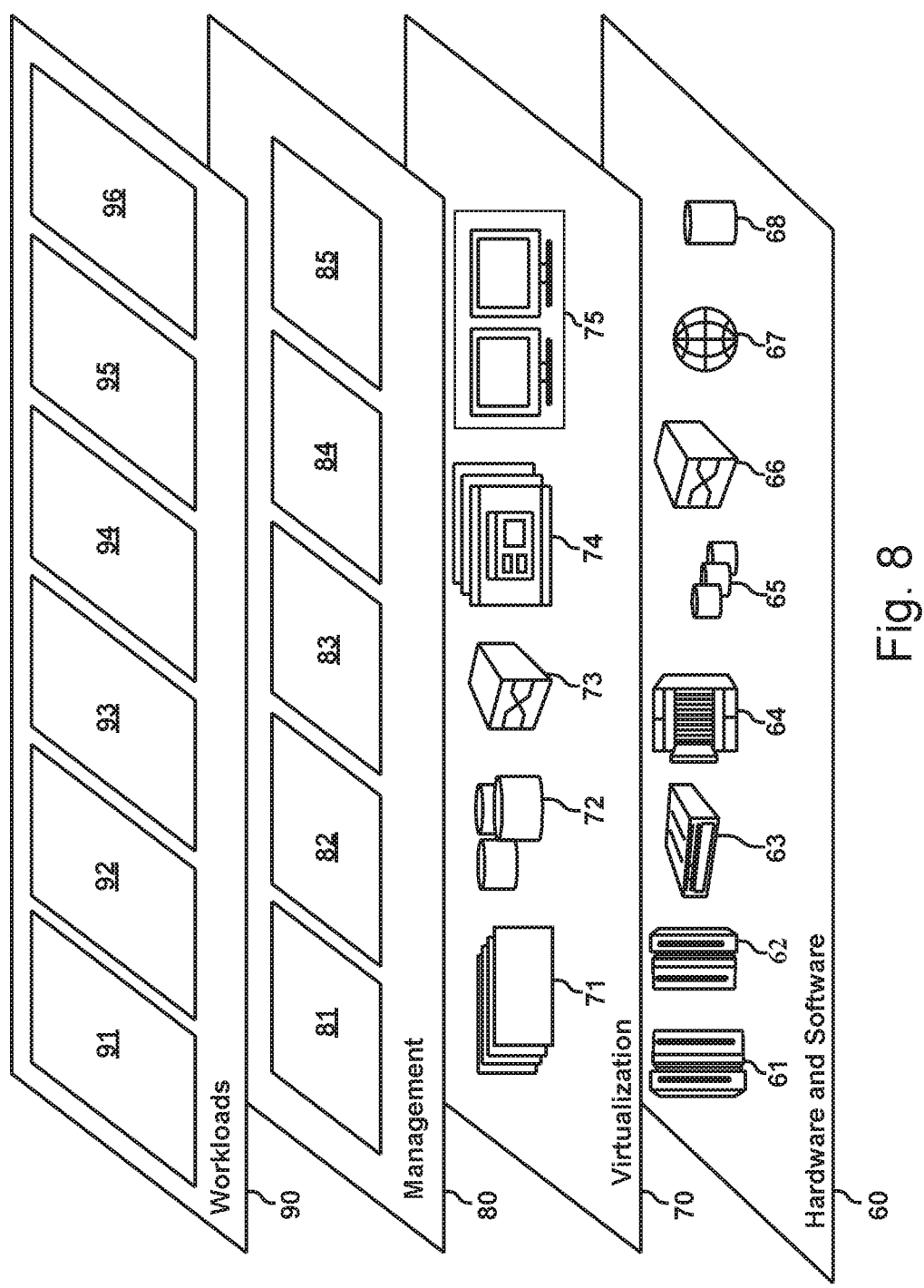
FIG. 8 shows a set of functional abstraction layers provided by cloud computing environment of FIG. 7.

FIG. 8 shows a set of functional abstraction layers provided by cloud computing environment 50 of FIG. 7. It should be understood in advance that the components, layers, and functions shown in FIG. 8 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Figure 9A:
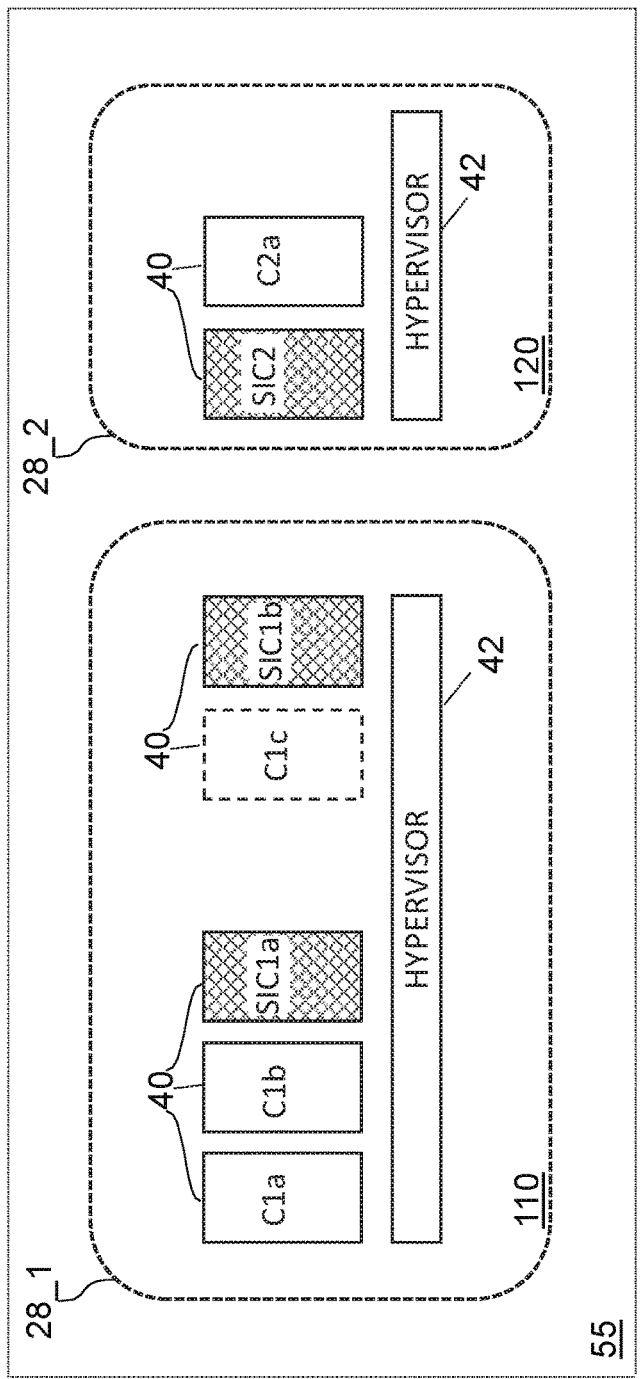
FIG. 9A is a system diagram of a cloud environment according to an embodiment of the disclosure.

FIG. 9A is a system diagram of a cloud environment according to an embodiment of the disclosure. The cloud environment exists within a peer-to-peer network 55 as is part of a standard cloud computing environment as already described in the background section and also the above part of the detailed description. An owner of a set of containers 40 run by a hypervisor 42 defines a system instance 110 based around the hypervisor and the set of containers. The containers 40 exist as virtual machines running on the hypervisor 42. The hypervisor 42 provides shared access for multiple containers to a kernel (not shown), where each kernel includes an operating system permitting the containers of the group associated with that kernel to be run. The system instance 110 may be thought of as those elements which are confined within a system boundary 28_1. The system boundary can be defined around an arbitrary set of containers to give a specific system instance for running any of those containers. The system boundary may be conceptual defined by a set of rules to which any containers in that system instance must adhere, or physical, such as a geographical boundary, wherein even in the case of a physical boundary, this will be defined by a set of rules. The same owner or another owner may create a further system instance 120, as illustrated by another system boundary 28_2 with its own hypervisor 42 and containers 40.

Blockchain technology is used through making the public ledger a record of which containers are part of the set of containers that are permitted to mutually co-exist and interact, which we refer to as lying within the system boundary. The system boundary or region is created as a system instance within a blockchain. Each container is a member of the blockchain.

Figure 9B:
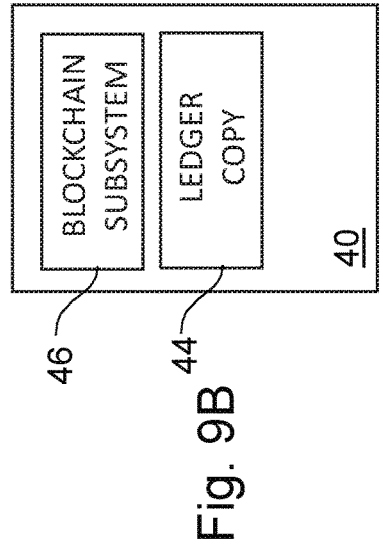
FIG. 9B illustrates a container from the system of FIG. 9A.

FIG. 9B illustrates a container 40. Each container 40 holds its copy of the public ledger copy 44 and its copy of the blockchain software, which runs on the container. We refer to this as the blockchain subsystem 46. A container's blockchain subsystem 46 is responsible for providing the set of local services on the container to manage that container's local copy of the public blockchain ledger and to perform other blockchain-specific networking tasks. Each container runs a blockchain subsystem 46 and maintains a copy of the blockchain's public ledger 44, so that all containers which are members of the same blockchain can interact with each other. The blockchain subsystem 46 has the ability to identify other containers on the network and be able to broadcast and receive messages relating to the maintenance of the public ledger 44. Each blockchain subsystem 46 exists as a service running on its container 40, with communication between the containers being used to make the blockchain updates. The blockchain forms a network, which is an "emergent" network that arises as a consequence of the containers communicating with each other peer-to-peer. The system boundary or region is a functional one defined using the distributed blockchain ledger 44 which is available to all containers 40 of a particular set of containers within the system instance 110 (or 120). The set of containers may be containers that are used in a specific jurisdiction, i.e. within certain geographical boundaries, to comply with data protection laws, or containers that provide data or services that should only be accessed by specific users or types of users.

In the envisaged blockchain, the transactions are the data of the containers. The blocks in the blockchain store the state of a container, initially when it was added to the system instance, but also after each update. Namely, each time a software update is run on a container, the blockchain is updated by adding a transaction representing the state of the updated container to the public ledger. The current state of a container can be logged by hashing certain targeted directories within the container, such as /etc, /bin or /sbin. A tool such as md5deep (http://md5deep.sourceforge.net/) could be used to create a set of hashes for these directories.

Only containers that have a transaction logged in the blockchain are considered within the system boundary and only containers that have a transaction logged in the blockchain are permitted to add a block to the blockchain consist with the concept that the containers are the blockchain members. All containers can check this, since they all have access to the public ledger. Only containers that are already validated as being in the blockchain can add blocks to the blockchain.

It is noted that other container-related information could also be stored in the blockchain, for instance the type of container (database/web server etc.).

At least one container within each system instance is nominated as a system instance controller (SIC). A SIC is the only container type having the right to create new containers within the system instance. After a new container is created, its initial state is added to the blockchain by the SIC as a transaction by hashing the new container's contents as well as a hash of the creating SIC in order to provide a record that it was the creator of the container.

SICs could be audited periodically by other nominated nodes. SIC rights could be rotated around multiple containers within the system instance to distribute the service. Any updates or changes to SICs could also be recorded as transactions in the blockchain. The creation date stamp and origination of any container can thus be tracked back to the SIC which created it, since the creating SIC will be referenced in the first transaction for that container as recorded on the public ledger.

For example, with reference to FIG. 9A, if the SIC SIC1$a$ is the currently nominated controller for the system instance 110 it may be in the course of creating a new 'regular' container C1$c$ which is indicated by the dashed lines. At some time, SIC1$a$ may decide to rotate its controlling status and pass it over to a container labeled SIC1$b$. Also with reference to FIG. 9A, the second system instance 120 also has containers 40 including a 'regular' container C2$a$ and a SIC, SIC2, as well as its own hypervisor 42. No containers 40 are shared between the two system instances, since they have respective blockchains which keep them separate and non-interacting.

This approach can propagate through multiple generations, so for example a container can be traced back to its creating SIC container, which is likely to be a container that was itself created by another SIC container and so forth. In any case, the lineage through however many generations exist back to the original creation of the system instance can always be traced through the public ledger.

The system boundary is effective, since, when a container on the network wishes to do some kind of work with another container, it can query the public ledger of its own system instance as to whether the other container is within its system boundary or not. If the other container has no transactions on the public ledger, then the container knows that the other container is not part of its system instance, i.e. not within its system boundary, so all communication with that other container can be discontinued. The blockchain would also be available as an auditable and tamper-proof ledger of all container based activity within the system. Any container that belongs to a particular system instance can thus verify whether any other container belongs to the same system instance with reference to the public ledger for that system instance.

The instant system provides a way for a business to secure its own container-based systems in isolation to the underlying hypervisor and/or container host system(s) while still remaining 100% cloud based. There is no reliance on any one hypervisor or hosting provider. A business is not tied to one particular hosting provider to ensure that its containers comply with particular contractual or other legal conditions relating to where data is stored or to whom services are offered, whether that be in the cloud or as a traditional hosting server. Rather the business can ensure legal compliance of its containers autonomously through the blockchain which it has full control over, without the need to work together with the hosting providers that it uses, and without regard to the mechanics of how the data is stored in a network, whether that be a cloud-type network or traditional network. The distributed nature of blockchain storage also means that the usual blockchain security advantages are gained, i.e. there is no reliance on a single central database server which is a single point of vulnerability. The nature of the public ledger also means there is full traceability over the whole history of the blockchain, which is a further strength having regard to auditability for checking that legal compliance has been adhered to. The tamper proof nature of a blockchain public ledger further enhances security.

The nature of containers means that by definition each is a self-contained piece of software that includes everything it needs to run. By encapsulating the container in a block of a blockchain, it is possible to check the contents of any container at any time simply by looking at the contents of the relevant block.

With the instant approach, a network can remain open, since communication between all containers on the network is permitted. However, for those containers on the network that are part of the same blockchain system instance as described, they can reliably recognize all other containers belonging to their system instance and restrict or prevent any interaction with 'foreign' containers beyond mere identification of friend or foe.

The ability to tie a set of containers to a particular geographical limitation has significant implications for the application possibilities, since geographical limitation is a basic requirement of many governmental activities, i.e. a government and its laws generally apply only to the jurisdiction itself, and legislation or public policy may forbid data to be stored outside the jurisdiction. Geographical limitation is also a requirement of heavily regulated services such as banking through the legislation under which banks operate. For example, if the containers are used to manage a real (i.e. non-digital) currency, then a geographical limitation will probably be a requirement.

The distributed nature of the blockchain data means that even if a large proportion of the container-based system is compromised and/or goes down, the entire history and identity of all containers within the same system instance will be available from any one container. This decreases the risks associated with business continuity.

In this way, blockchain technology is used to define a standalone container-based software system which is truly distributed based on a public ledger available across multiple nodes of network with the ability to audit container activity on the network.

Figure 10:
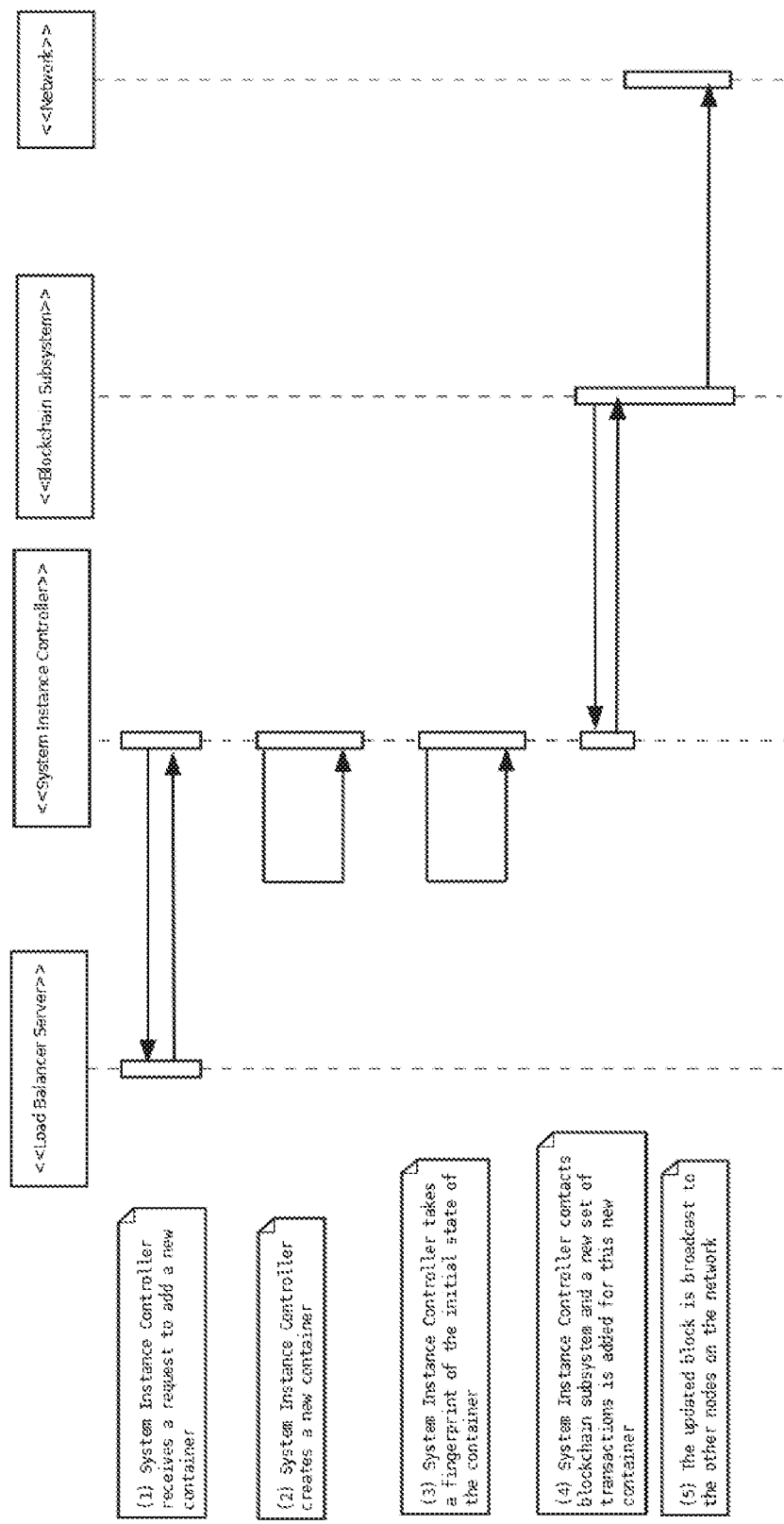
FIG. 10 shows a process for adding a new container in accordance with an embodiment of the present disclosure.

FIG. 10 shows a process for adding a new container.

In Step 1, the currently nominated system instance controller receives a request to add a new container which will typically come from a load balancer server which is a server that has the role of monitoring the network resources and requesting extra resources (in this case a container) when the network load is busy enough to warrant such action. In principle though, any network node in a cloud environment could act as a source of requests.

In Step 2, the system instance controller creates the new container.

In Step 3, the system instance controller takes a fingerprint of, i.e. hashes, the contents of the new container in its initial state, and also hashes some aspect of its own data to provide a permanent record that it was the creator.

Is Step 4, the system instance controller contacts the blockchain subsystem and a new set of transactions is added for this new container.

In Step 5, the new block of the blockchain associated with the new container is broadcast to the other nodes of the network and is thus received by all members of the blockchain, which in general will represent a subset of the network nodes.

Figure 11:
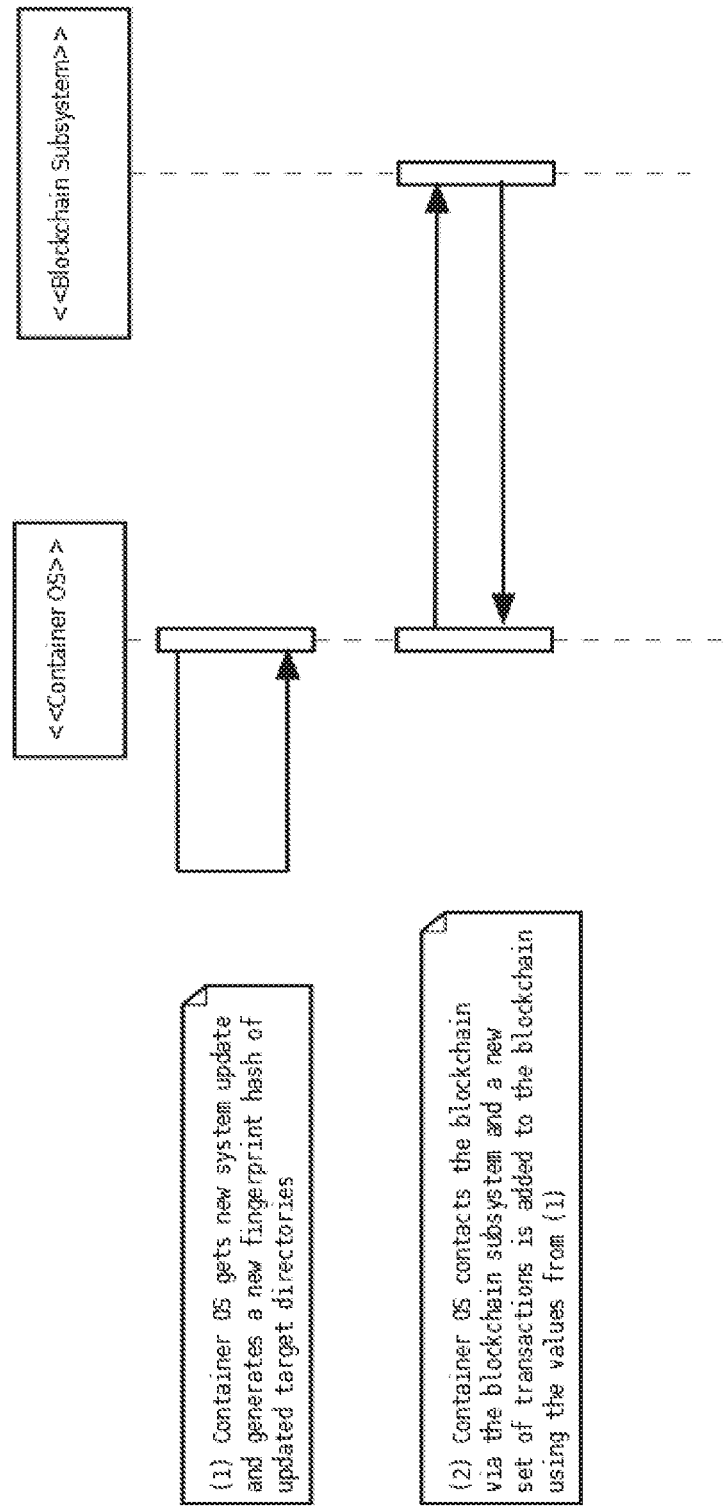
FIG. 11 shows a process for running a software update on an existing container in accordance with an embodiment of the present disclosure.

FIG. 11 shows a process for running a software update on an existing container.

In Step 1, the container operating system receives a system update and after performing the update hashes its updated contents, at least in respect of any directories that have been affected by the update.

In Step 2, the container operating system contacts the blockchain via the blockchain subsystem and a new set of transactions reflecting the update is added to the blockchain, i.e. the public ledger.

Figure 12:
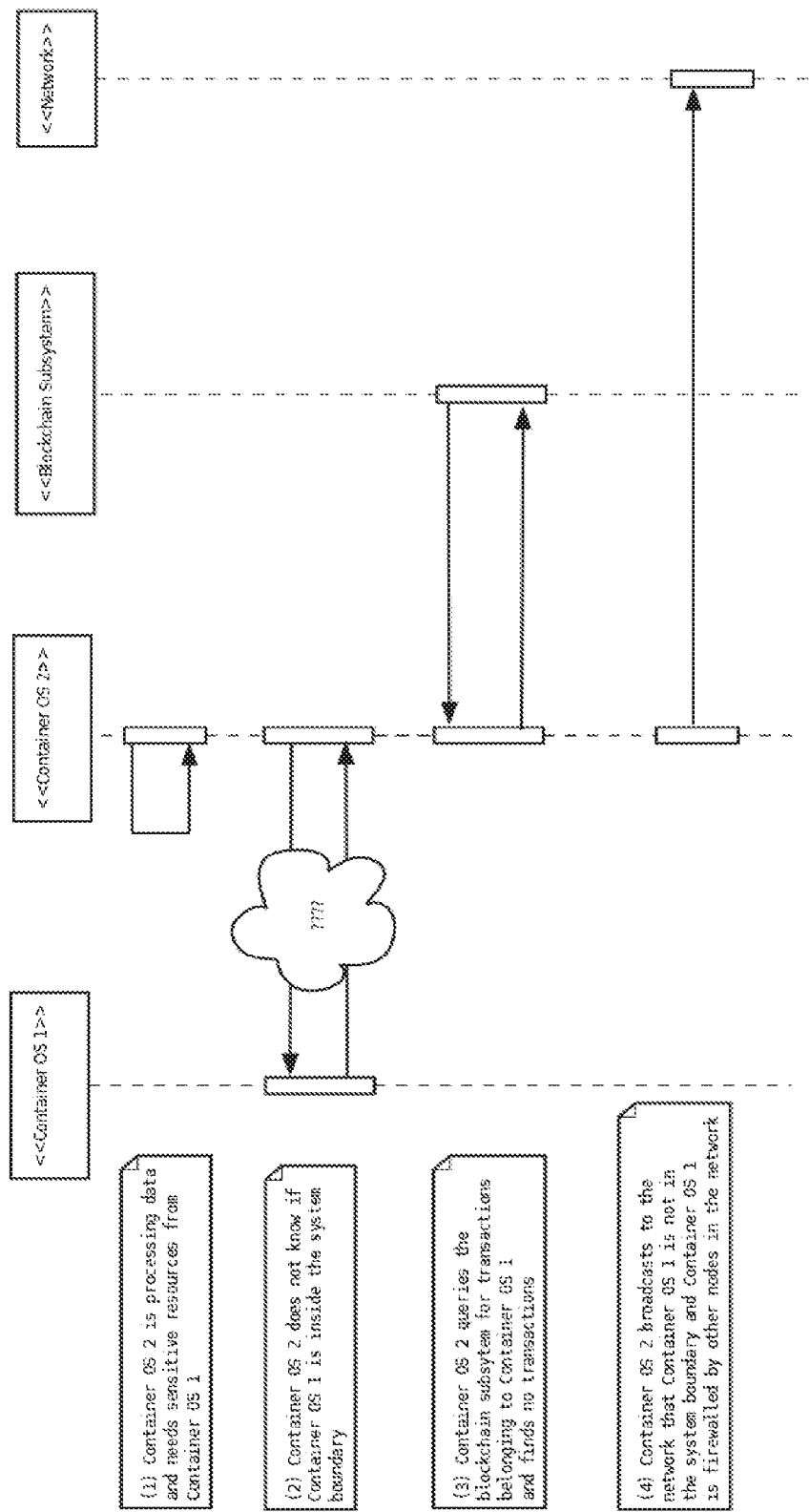
FIG. 12 shows, in accordance with an embodiment of the present disclosure, a process by which a container checks whether another container is within its system boundary.

FIG. 12 shows a process by which a container checks whether another container is within its system instance, i.e. within its system boundary.

In Step 1, a second container operating system is processing data and needs to access resources from a first container operating system.

In Step 2, the second container realizes that it needs to verify whether the first container is inside the system boundary.

In Step 3, the second container queries the blockchain subsystem for transactions belonging to the first container. The public ledger contains no transactions relating to the first container, from which the second container infers that the first container lies outside the system boundary.

In Step 4, the second container broadcasts to the network that the first container is not in the system boundary, so that all other network nodes belonging the to the system instance of the second container firewall the first container.

Figure 13:
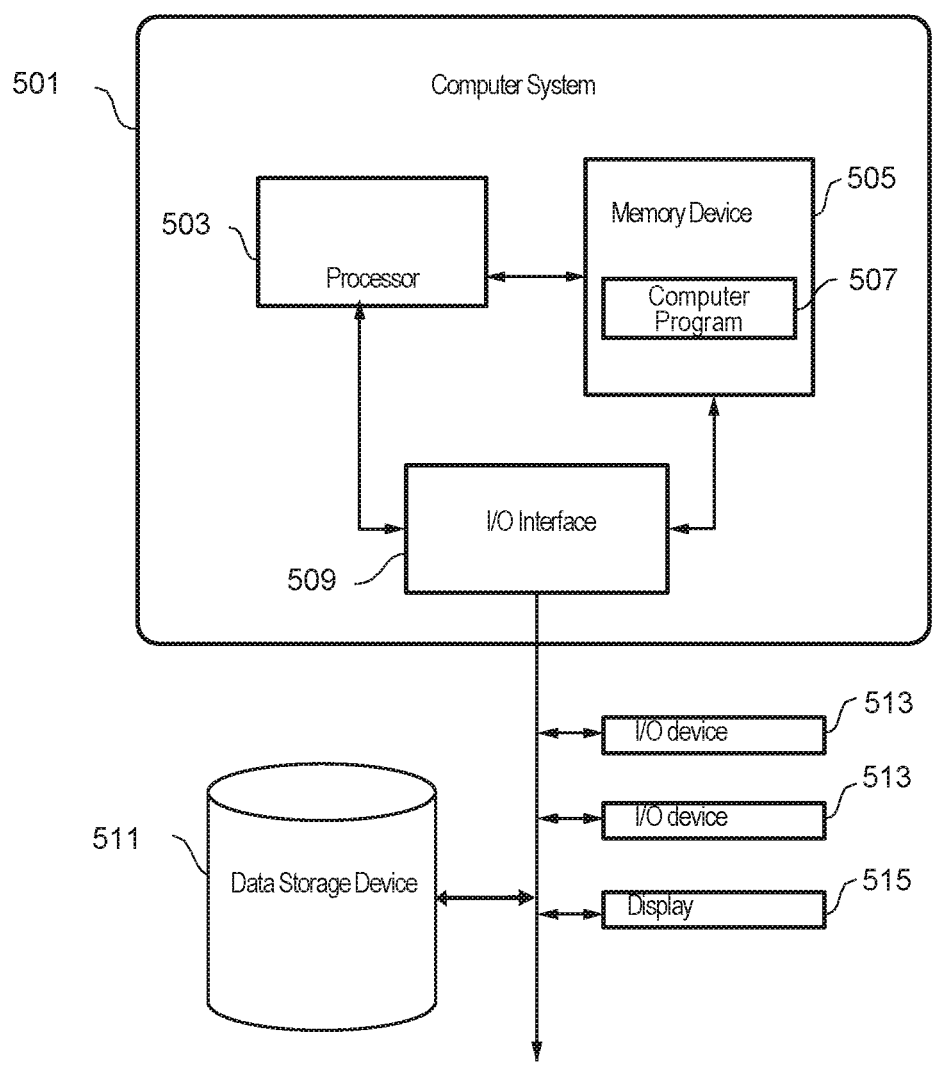
FIG. 13 shows a generic computer device.

FIG. 13 shows a structure of a computer system 501 and computer program 507 that may be used to implement a network node, such as a client or a server, as described above. The computer system 501 comprises a processor 503 to provide a processor resource coupled through one or more I/O interfaces 509 to one or more hardware data storage devices 511 and one or more I/O devices 513, which can manage graphic object requests, and a display 515 on which the graphics objects can be displayed. The processor 503 may also be connected to one or more memory devices 505. At least one memory device 505 to provide a memory resource contains stored computer program 507, which is a computer program that comprises computer-executable instructions. The data storage devices 511 may store the computer program 507. The computer program 507 stored in the storage devices 511 is configured to be executed by processor 503 via the memory devices 505. The processor 503 executes the stored computer program 507.

It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present disclosure may be realized in the form of a computer implemented method of deploying a service comprising steps of deploying computer program operable to, when deployed into a computer infrastructure and executed thereon, cause the computer system to perform all the steps of the method.

It will be appreciated that the method and components of the preferred embodiment may alternatively be embodied fully or partially in a parallel computing system comprising two or more processors for executing parallel software.

A further embodiment of the disclosure is a computer program product defined in terms of a system and method. The computer program product may include a computer-readable storage medium (or media) having computer-readable program instructions thereon for causing a processor to carry out aspects of the present disclosure.

The computer-readable storage medium can be a tangible device that can retain and store instructions for use by an instruction execution device The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

In the above detailed description, we have described how, in a distributed network hosting a shared pool of configurable computing resources, there can be provided one or more system instances of a blockchain. Each system instance comprises a virtual machine and a set of containers. The containers are members of the blockchain in that the blockchain's public ledger records encrypted copies of at least selected directories of each container. Each container that is in the set can thus verify whether any other container is also part of the same set with reference to the public ledger, since the transactions recorded on the public ledger are encrypted copies of the set's containers. The use of a blockchain thus allows a system boundary to be defined around a set of containers by the initial specification of the blockchain. This is useful, since the system boundary can be defined to ensure that the set of containers comply with legal requirements, such as geographic restrictions or rights management.

It will be clear to one skilled in the art that many improvements and modifications can be made to the foregoing exemplary embodiment without departing from the scope of the present disclosure.

What is claimed is:

1. A distributed network hosting a shared pool of configurable computing resources suitable for hosting one or more system instances of a blockchain having a public ledger that records transactions in the blockchain, the distributed network comprising: one or more processors;
   one or more data storage devices coupled to the one or more processors, and one or more system instances, wherein each system instance comprises a virtual machine and a set of containers operated by the one or more processors, wherein the containers are operable to run on the virtual machine and each container comprises a blockchain subsystem operable to run the blockchain on the containers, wherein the blockchain is defined such that the containers of the set are the members of the blockchain and the public ledger records encrypted copies of information corresponding to each container of the set, the public ledger stored in the one or more data storage devices, at least one container of the set to perform a check to determine whether another container in the distributed network also belongs to the set by referencing the information in the public ledger, the information in the public ledger to create a system boundary for the set of containers, preventing undesired interaction with other containers that are not in the set.

2. The network of claim 1, wherein for each system instance one container is designated at any one time to have a role of system instance controller, and wherein the system instance controller has a sole right to create new containers for the set, the system instance controller being operable to create such new containers.

3. The network of claim 2, wherein the blockchain is configured such that the role of system instance controller is rotated over time among different ones of the containers of the set.

4. The network of claim 1, wherein the blockchain is configured such that whenever a container receives a software update, information indicative of the software update is recorded as the encrypted copies of the information of the public ledger.

5. The network of claim 1, wherein the at least one container of the set is operable to initiate communication with the another container which may or may not be in the set, and the at least one container is to check whether or not the another container is in the set by via a search of the public ledger for an encrypted copy of the information corresponding to the another container in the public ledger.

6. The network of claim 5, wherein, if the at least one container of the set determines the another container is not in the set, the at least one container is operable to record the fact that the another container is not in the set in the public ledger.

7. The network of claim 1, wherein the plurality of system instances co-exist on the distributed network.

8. The network of claim 1, wherein the distributed network further includes containers that do not belong to any of the system instances and are not part of the blockchain.

9. The network of claim 1, wherein the blockchain is defined such that each container of the set is precluded from belonging to another blockchain.

10. The network of claim 1, wherein the blockchain is defined such that the system boundary is a geographical restriction which imposes physical limits on where the containers may reside among the shared pool of configurable computing resources that form the distributed network.

11. A system, comprising:
    a storage device;
    one or more processors to run a container on a virtual machine based on instructions stored in the storage device, the container including:
    a memory resource;
    a processing resource corresponding to the one or more processors;
    a blockchain subsystem operable to run a blockchain on the container using the processing resource, wherein the blockchain has a public ledger; and
    a copy of the public ledger stored in the memory resource;
    wherein the blockchain is defined such that the public ledger records encrypted copies of information corresponding to the container and each of one or more other containers, the container and the one or more other containers collectively constituting a set of containers who are members of the blockchain and correspond to a same system instance, the public ledger queried for information indicating whether another container is in the set, the information to create a system boundary, preventing undesired interaction between the container and the another container when information of the another container is not in the public ledger.

12. The system of claim 11, wherein the container is ascribed the exclusive right to create new containers for the blockchain.

13. The system of claim 11, further comprising:
    a computer program product that stores the container.

14. A method of creating a new container that is performed in a distributed network hosting a shared pool of configurable computing resources in which there exists a system instance of a blockchain, the members of the blockchain being containers and the blockchain having a public ledger that is stored in a storage device and that records transactions in the blockchain, wherein the blockchain is defined such that the public ledger records encrypted copies of one or more selected parts of each container of the set, the method comprising operations performed by at least one processor, the operations including:
    designating one of the containers to have the role of system instance controller, wherein the system instance controller has the sole right to create new containers for the set;
    creating the new container by the system instance controller;
    encrypting a copy of selected parts of the new container such that the new container creation is performed as a blockchain transaction; and
    recording the encrypted copy on the public ledger.

15. A method of performing a software update on a container that resides in a distributed network hosting a shared pool of configurable computing resources in which there exists a system instance of a blockchain, the members of the blockchain being containers including the container on which the software update is performed, the blockchain having a public ledger that is stored in a storage device and that records transactions in the blockchain, the method comprising operations performed by at least one processor, the operations including:
    executing the software update on the container;
    encrypting a copy of one or more selected parts of the updated container such that the software update is performed as a blockchain transaction; and
    recording the encrypted copy of the one or more selected parts of the updated container on the public ledger.

16. A method for a first container to determine a second container belongs to the same set of containers, the method being performed in a distributed network hosting a shared pool of configurable computing resources in which there exists a system instance of a blockchain, the members of the blockchain being the containers of the set of containers, which include at least the first container, and the blockchain having a public ledger that is stored in a storage device and that records transactions in the blockchain, wherein the blockchain is defined such that the public ledger records encrypted copies of at least selected parts of each container of the set, the method comprising operations performed by one or more processors, the operations including:

- the first container in the course of executing a sequence of software commands, identifying a command to access a second container;
- the first container, establishing a network connection to the second container and obtaining information regarding the identity of the second container;
- the first container, referring to the public ledger, determining whether the second container is recorded in a transaction on the blockchain;
- absent such a transaction, inferring the second container is not a member of the blockchain, and refraining from executing the command to access the second container; and
- present such a transaction, inferring the second container is a member of the blockchain and executing the command to access the second container.

17. The method of claim 16, wherein, if the second container is not a member of the blockchain, recording the fact that the second container is not a member on the public ledger, such that the determination that the second container is not a member of the blockchain is processed as a blockchain transaction.

18. The method of claim 16, wherein the first container of the set is operable to initiate communication with another container which may or may not be in the set, and the first container is able to perform determining whether or not the other container is in the set by searching the public ledger for an encrypted copy of the other container in the public ledger.

19. The method of claim 18, wherein, if the first container of the set determines the other container is not in the set, the container is operable to record the fact that the other container is not in the set in the public ledger.

20. The method of claim 16, wherein the blockchain is defined such that each container of the set is precluded from belonging to another blockchain.

* * * * *